US011743622B2

(12) United States Patent
Zhang et al.

(10) Patent No.: US 11,743,622 B2
(45) Date of Patent: Aug. 29, 2023

(54) DATA TRANSMISSION METHOD AND APPARATUS, AP, ONU PON, NETWORKING AND STORAGE MEDIUM

(71) Applicant: ZTE CORPORATION, Guangdong (CN)

(72) Inventors: Hongxi Zhang, Guangdong (CN); Mingsheng Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 125 days.

(21) Appl. No.: 17/432,337

(22) PCT Filed: Feb. 18, 2020

(86) PCT No.: PCT/CN2020/075752
§ 371 (c)(1),
(2) Date: Aug. 19, 2021

(87) PCT Pub. No.: WO2020/169031
PCT Pub. Date: Aug. 27, 2020

(65) Prior Publication Data
US 2022/0141560 A1 May 5, 2022

(30) Foreign Application Priority Data
Feb. 19, 2019 (CN) .......................... 201910123729.0

(51) Int. Cl.
*H04W 72/12* (2023.01)
*H04Q 11/00* (2006.01)
(Continued)

(52) U.S. Cl.
CPC ........ *H04Q 11/0067* (2013.01); *H04W 72/51* (2023.01); *H04Q 2011/0086* (2013.01); *H04W 88/06* (2013.01)

(58) Field of Classification Search
CPC .................................................. H04W 72/51
See application file for complete search history.

(56) References Cited

U.S. PATENT DOCUMENTS

| 6,778,550 B1 * | 8/2004 | Blahut | H04J 3/1694 |
| | | | 370/449 |
| 2010/0014452 A1 * | 1/2010 | Ueba | H04W 28/04 |
| | | | 370/315 |

(Continued)

FOREIGN PATENT DOCUMENTS

| CN | 101753412 A | 6/2010 |
| CN | 101925134 A | 12/2010 |

(Continued)

OTHER PUBLICATIONS

WIPO, International Search Report dated Apr. 28, 2020.
China Patent Office, First Office Action dated Mar. 24, 2022, for corresponding Chinese application 201910123729.0.

*Primary Examiner* — Shi K Li
(74) *Attorney, Agent, or Firm* — Li & Cai Intellectual Property (USA) Office

(57) ABSTRACT

Disclosed in embodiments of the present invention are a data transmission method and apparatus, a wireless Access Point (AP), a Passive Optical Network module of an Optical Network Unit (ONU PON), WLAN and PON networking, and a storage medium. The method includes: sending, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information; and receiving service data from the STA and forwarding the (Continued)

same to the ONU PON, the service data being used to be forwarded to the OLT according to the corresponding bandwidth.

9 Claims, 8 Drawing Sheets

(51) Int. Cl.
*H04W 72/51* (2023.01)
*H04W 88/06* (2009.01)

(56) References Cited

U.S. PATENT DOCUMENTS

| | | |
|---|---|---|
| 2015/0326318 A1 | 11/2015 | Yamashita et al. |
| 2018/0255583 A1* | 9/2018 | Andreoli-Fang ............................ H04W 74/0816 |
| 2019/0075575 A1* | 3/2019 | Alpert ................... H04W 72/21 |
| 2020/0374927 A1* | 11/2020 | Yu ....................... H04W 74/006 |

FOREIGN PATENT DOCUMENTS

| | | | | |
|---|---|---|---|---|
| CN | 102076106 A | | 5/2011 | |
| CN | 103518355 A | * | 1/2014 | ......... H04L 12/4625 |
| CN | 103518355 A | | 1/2014 | |
| CN | 105101249 A | | 11/2015 | |
| CN | 107465557 A | | 12/2017 | |
| CN | 108292963 A | | 7/2018 | |
| CN | 108449286 A | | 8/2018 | |
| WO | 2011038531 A1 | | 4/2011 | |

* cited by examiner

DATA TRANSMISSION METHOD AND APPARATUS, AP, ONU PON, NETWORKING AND STORAGE MEDIUM

CROSS-REFERENCE TO RELATED APPLICATION

The present application claims priority from the Chinese patent application No. 201910123729.0 filed with the China Patent Office on Feb. 19, 2019, the entire contents of which are incorporated in the present application by reference.

TECHNICAL FIELD

The present disclosure relates to the field of data transmission, and particularly relates to a data transmission method and apparatus, a wireless Access Point (AP), a Passive Optical Network module of an Optical Network Unit (ONU PON), WLAN and PON networking, and a storage medium.

BACKGROUND

In a data access network, hybrid networking of a Wireless Local Area Network (WLAN) and a Passive Optical Network (PON) is a prevailing application. Such networking mainly includes two forms: 1. providing, on an ONU device of the PON, a WLAN interface, and providing a wireless Access Point (AP) function, in which a Station (STA) device of the WLAN may access an uplink network via the WLAN and the PON; and 2. hooking (connecting) a switch or router under an ONU interface (a wired Ethernet interface) of the PON, in which the switch or router is provided with a WLAN interface for the STA to access the uplink network.

With the development of network services, the requirements of data services on latency (time-delay) are gradually increased. Especially with the continuous development of internet games, Augmented Reality (AR) technologies, and Virtual Reality (VR) technologies, the latency has become a bottleneck of the network. For hybrid WLAN and PON networking, generally speaking, uplink latency of an uplink interface from an STA to an Optical Line Terminal (OLT) of the PON may be more than 100 ms, which may greatly influence a latency sensitive service.

SUMMARY

The present disclosure provides a data transmission method and apparatus, a wireless Access Point (AP), a Passive Optical Network module of an Optical Network Unit (ONU PON), WLAN and PON networking, and a non-transitory computer-readable storage medium that can effectively reduce latency.

A data transmission method is provided, the method including steps of: sending, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information; and receiving service data sent from the STA and forwarding the same to the ONU PON, the service data being used to be forwarded to the OLT according to the corresponding bandwidth.

Further provided is a data transmission method, including steps of: receiving inform signaling carrying data packet information sent from a wireless Access Point (AP), and sending bandwidth application signaling to an Optical Line Terminal (OLT) according to the inform signaling, the bandwidth application signaling being used for the OLT to assign a corresponding bandwidth matched with the data packet information.

Further provided is a data transmission apparatus, including an inform signaling module and a data forwarding module. The inform signaling module is configured to send, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information; and the data forwarding module is configured to receive service data sent from the STA and forward the same to the ONU PON, the service data being used to be forwarded to the OLT according to the corresponding bandwidth.

Further provided is a wireless Access Point (AP), including a processor, and a memory storing a computer program executable on the processor. The processor is configured to, when executing the computer program, perform the data transmission method applied to the AP according to any embodiment of the present application.

Further provided is a data transmission apparatus, including a bandwidth application module configured to receive inform signaling carrying data packet information sent from a wireless Access Point (AP), and send bandwidth application signaling to an Optical Line Terminal (OLT) according to the inform signaling, the bandwidth application signaling being used for the OLT to assign a corresponding bandwidth matched with the data packet information.

Further provided is a Passive Optical Network module of an Optical Network Unit (ONU PON), including a processor, and a memory storing a computer program executable on the processor. The processor is configured to, when executing the computer program, perform the data transmission method applied to the ONU PON according to any embodiment of the present application.

Further provided is WLAN and PON networking, including the wireless Access Point (AP) according to any embodiment of the present application, and the Passive Optical Network module of an Optical Network Unit (ONU PON) according to any embodiment of the present application; or including the data transmission apparatus applied to an AP according to any embodiment of the present application, and the data transmission apparatus applied to an ONU PON according to any embodiment of the present application.

Further provided is a non-transitory computer-readable storage medium storing executable instructions thereon which, when executed by a processor, cause the data transmission method according to any embodiment of the present application to be implemented.

According to the data transmission method and apparatus, the wireless Access Point (AP), the Passive Optical Network module of an Optical Network Unit (ONU PON), the WLAN and PON networking, and the storage medium provided in the present disclosure, the AP directly sends, based on the data transmission request of the STA, inform signaling carrying data packet information to the ONU PON so that before the data packet is received, the corresponding bandwidth can be applied in advance from the OLT via the ONU PON based on the data packet information carried in the inform signaling. Therefore, the ONU PON can apply for the bandwidth corresponding to the service to be transmitted in advance, so as to obtain good compatibility of network devices, and thus, latency of the service data from the STA to the OLT of the PON can be effectively reduced on the premise of minimizing the cost.

DETAILED DESCRIPTION

Technical solutions of the present disclosure will be illustrated in further detail below with reference to the accompanying drawings and detailed embodiments. As used herein, the term "and/or" includes any and all combinations of one or more of the associated listed items.

In the following description, reference is made to the expression "some embodiments", which describes a subset of all possible embodiments, but it should be understood that "some embodiments" may be the same subset or a different subset of all possible embodiments, and may be combined with each other if no conflict is caused.

Figure 1:
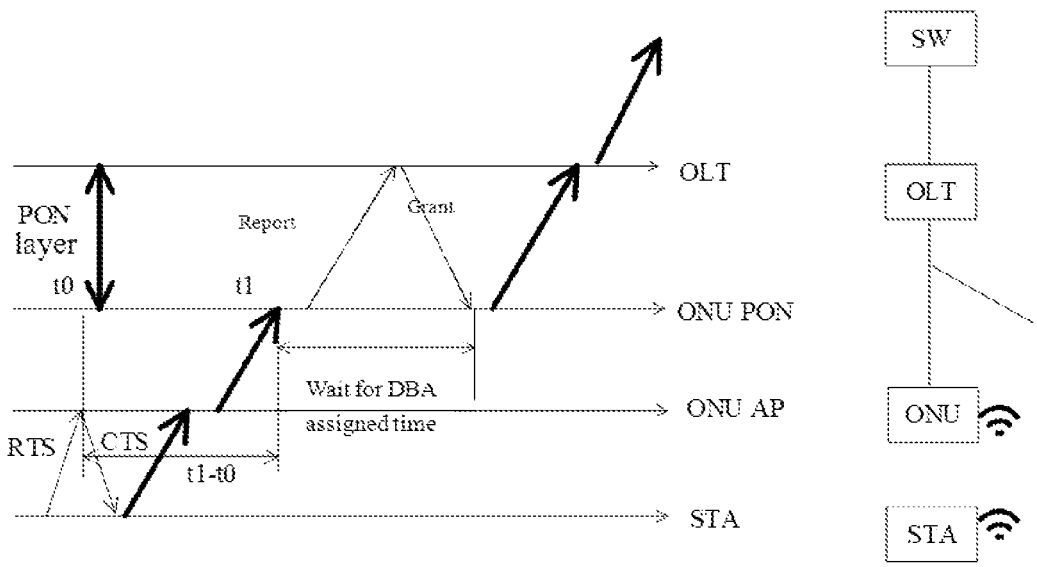
FIG. 1 is a schematic diagram of a data transmission method based on WLAN and PON networking.

The WLAN and PON networking is shown in FIG. 1. According to a data transmission method based on the WLAN and PON networking, before an STA sends uplink service data to a wireless AP, the STA sends data request signaling "Request To Send (RTS)" to the AP. The AP returns a data response signaling "Clear To Send (CTS)" upon determining that the recipient (receiving end) is the AP itself, and the STA starts transmission (Expected frame transmission) of the uplink service data based on the received CTS signaling. As shown in FIG. 1, the RTS signaling reaches the AP at time t0. The AP returns CTS signaling to the STA when determining to receive, and receives data frames (indicated by bold arrows in FIG. 1) from the STA in a later period. Then, the data frames are forwarded to a PON processing unit of the ONU, called the ONU PON. The ONU PON determines a length of the data frames at time t1, and then applies for a bandwidth from an Optical Line Terminal (OLT) by sending report signaling. Based on the report signaling, the OLT calculates a result of a Dynamic Bandwidth Allocation (DBA) module and sends the result to the ONU PON via grant signaling, where the ONU PON forwards the data frames to the OLT according to time slices assigned by the OLT. As indicated by oblique lines between the OLT and the ONU in the right diagram of FIG. 1, the OLT may be communicatively connected to a plurality of ONU PONS to implement corresponding bandwidth assignment.

The WLAN and PON networking will introduce store-and-forward latency (delay) due to the Ethernet interface between the ONU PON and the AP. Especially for the uplink direction involving scheduling of multiple STAs of the WLAN and scheduling of multiple ONUs in the PON layer, more latency is additionally introduced. Therefore, in order to effectively reduce the uplink latency in the WLAN and PON networking, it is possible to focus on optimizing the time occupied by t1 to t0.

Figure 2:
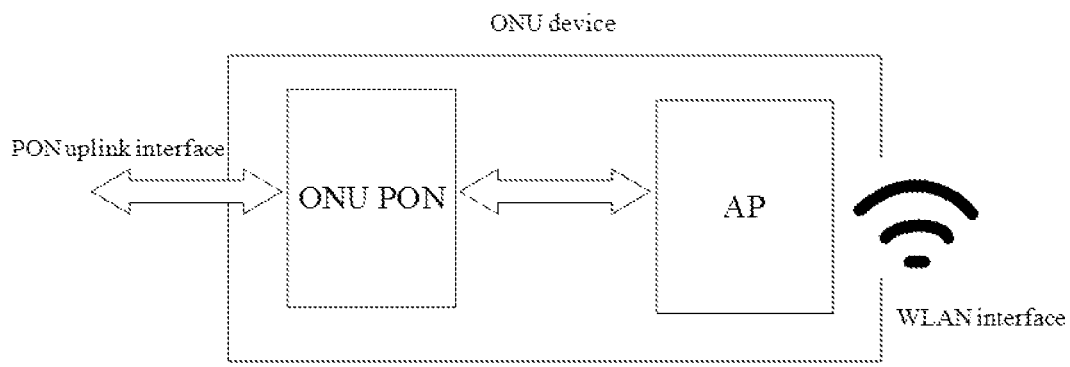
FIG. 2 is a schematic diagram illustrating architecture of WLAN and PON networking in an embodiment of the present application.
Figure 3:
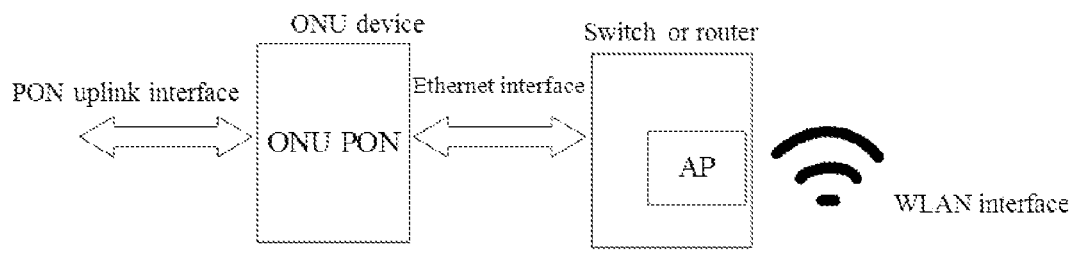
FIG. 3 is a schematic diagram illustrating architecture of WLAN and PON networking in another embodiment of the present application.

Referring to FIG. 2, FIG. 2 is a schematic diagram illustrating an architecture of WLAN and PON networking provided in an embodiment of the present application, in which the ONU PON and the AP together form an integral ONU device that is provided with a WLAN interface for an AP function. An STA device of the WLAN may access an uplink network via the WLAN and the PON. Referring to FIG. 3, FIG. 3 is a schematic diagram illustrating an architecture of WLAN and PON networking provided in another embodiment of the present application, in which the ONU PON and the AP are formed as independent, separate devices, the ONU PON is hooked with an AP device such as a switch or a router via a wired Ethernet interface, and the switch or router is provided with a WLAN interface for the STA device to access the uplink network. In the data transmission method based on WLAN and PON networking, after receiving the RTS signaling, the AP may send inform signaling carrying the data packet information to the ONU PON in advance upon determining that the recipient is the AP. In this manner, the ONU PON may receive the inform signaling in advance, and know the length of the data frames from the inform signaling, and then send a bandwidth application signaling (bandwidth request signaling) corresponding to the data packet to the OLT. On this basis, the ONU PON has sent out the bandwidth application signaling corresponding to the data packet to the OLT in advance before the data packet reaches the ONU PON, thereby achieving the purpose of effectively reducing latency.

Figure 4:
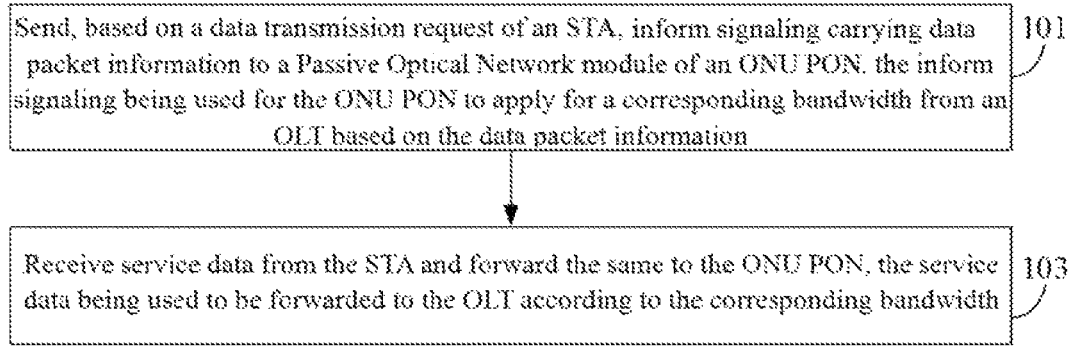
FIG. 4 is a schematic flowchart of a data transmission method based on WLAN and PON networking in an embodiment of the present application.

Referring to FIG. 4, FIG. 4 shows a data transmission method provided in an embodiment of the present application that can be applied to the AP shown in FIG. 2 or FIG. 3. The method includes the following steps 101 to 103.

At step 101, sending, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information.

Before sending uplink service data to the AP, the STA firstly sends the data request signaling (i.e., the RTS (Request To Send) signaling). Here, the AP acquiring the data transmission request from the STA may refer to the AP receiving the RTS signaling sent from the STA, or the AP collecting the data transmission request from the STA in a polling mode, or the like. Taking the example where the AP acquiring the data transmission request from the STA means the AP receiving the RTS signaling from the STA, the AP sends, based on the received RTS signaling sent from the STA, inform signaling carrying data packet information to the ONU PON so that the ONU PON applies for the corresponding bandwidth from the OLT based on the data packet information carried in the inform signaling. The AP sending, based on the data transmission request of the STA, inform signaling carrying data packet information to the ONU PON may refer to the AP sending, after receiving the RTS signaling from the STA and based on the RTS signaling, inform signaling carrying data packet information to the ONU PON at a set time point, or may refer to the AP sending, after collecting the data transmission request from the STA in a polling mode or the like and based on the collected data sending request, inform signaling carrying data packet information to the ONU PON at a set time point. The set time point may include any one of: Time point 1, which is within a specified time after the AP receives the RTS signaling; Time point 2, which is the same time when the AP returns CTS signaling to the STA based on the RTS signaling; and Time point 3, which is the same time when the AP receives an expected frame transmission instruction after collecting the data transmission request of the STA in a polling mode or the like.

In this manner, by the AP sending, based on the data transmission request of the STA, inform signaling carrying data packet information to the ONU PON, the ONU PON can apply for the bandwidth corresponding to the data packet information from the OLT in advance before receiving the uplink service data, and thus the uplink transmission latency is effectively reduced through effective coordination of the PON and the WLAN.

At step 103, receiving service data from the STA and forwarding the same to the ONU PON, the service data being used to be forwarded to the OLT according to the corresponding bandwidth.

Here, after receiving the bandwidth application signaling from the ONU PON, the OLT assigns a corresponding bandwidth to the AP corresponding to the ONU PON, and after the AP receives the service data sent from the STA and forwards the same to the ONU PON, the corresponding service data may be directly forwarded to the OLT via the assigned corresponding bandwidth, thereby reducing the uplink latency of the service data from the STA to an uplink interface of the OLT in the PON.

In the above embodiment of the present application, the AP directly sends, based on the data transmission request of the STA, inform signaling carrying data packet information to the ONU PON so that before the data packet is received, the corresponding bandwidth can be applied in advance from the OLT via the ONU PON based on the data packet information carried in the inform signaling. Therefore, the ONU PON can apply for the bandwidth corresponding to the service to be transmitted in advance, so as to obtain good compatibility of network devices, and thus, latency of the service data from the STA to the OLT of the PON can be effectively reduced on the premise of minimizing the cost.

In some embodiments, the corresponding bandwidth refers to a fixed bandwidth. After receiving the bandwidth application signaling from the ONU PON, the OLT assigns a corresponding fixed bandwidth to the AP corresponding to the ONU PON, thereby further effectively reducing latency of the subsequent uplink service data. In this manner, there is no need to apply for a bandwidth each time when the WLAN has continuous service data to be uploaded; instead, an uplink bandwidth may be obtained for a long time period through the assigned fixed bandwidth.

In some embodiments, the step of sending, based on the data transmission request of the STA, inform signaling carrying data packet information to the ONU PON includes:

receiving RTS signaling sent from the STA, and sending, in response to determining that the recipient of the RTS signaling is an AP, the inform signaling carrying the data packet information to the ONU PON within a specified time according to the RTS signaling.

Here, after receiving the RTS signaling from the STA, the AP performs confirmation as to whether the recipient of the RTS signaling is the AP, and when the AP confirms that the recipient is the AP, the AP performs the steps of returning the CTS signaling to the STA and sending the inform signaling carrying data packet information to the ONU PON. The specified time is an integer multiple of a short interframe space (SIFS). The SIFS may be used in a high-priority scenario, such as between RTS signaling and CTS signaling, to ensure atomicity of data transmission. In order to reduce the latency as much as possible, after receiving the RTS signaling from the STA and determining that the recipient is the AP, the AP should send the inform signaling carrying the data packet information to the ONU PON at a time point as soon as possible, and the specified time is typically one SIFS.

Figure 5:
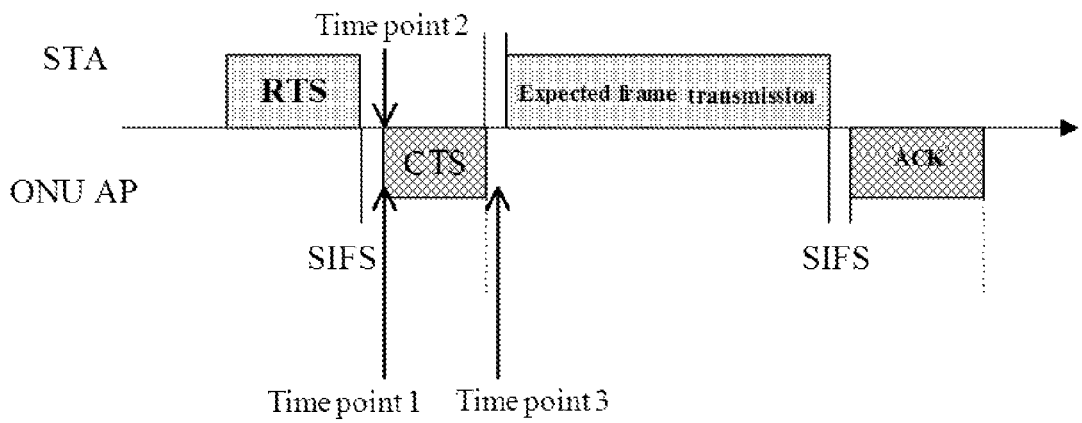
FIG. 5 is a schematic diagram illustrating time points when an AP sends inform signaling to an ONU PON in an embodiment of the present application.

Referring to FIG. 5, the AP may send the inform signaling carrying the data packet information to the ONU PON within a specified time according to the RTS signaling at Time point 1. That is, after receiving the RTS signaling sent from the STA and determining that the recipient is the AP, the AP sends the inform signaling carrying the data packet information to the ONU PON after one SIFS.

In some embodiments, the step of sending, based on the data transmission request of the STA, inform signaling carrying data packet information to the ONU PON includes:

receiving RTS signaling from the STA, and returning, in response to determining that a recipient of the RTS signaling is an AP, data response signaling, Clear To Send (CTS), according to the RTS signaling, and simultaneously sending the inform signaling carrying the data packet information to the ONU PON.

Here, after receiving the RTS signaling from the STA, the AP performs confirmation as to whether the recipient of the RTS signaling is the AP, and when the AP confirms that the recipient is the AP, the AP performs the steps of returning the CTS signaling to the STA and sending the inform signaling carrying data packet information to the ONU PON. A CTS signaling is returned based on the RTS signaling, while the inform signaling carrying the data packet information is sent to the ONU PON so that before receiving the data packet, the ONU PON can apply for the bandwidth corresponding to the data packet information from the OLT based on the data packet information carried in the inform signaling. In order to reduce the latency as much as possible, after receiving the RTS signaling from the STA and determining that the recipient is the AP, the AP should send the inform signaling carrying the data packet information to the ONU PON at a time point as soon as possible, and immediately sends inform signaling to the ONU PON while returning the CTS signaling to the STA. The time of the AP returning the CTS signaling to the STA and further receiving uplink service data from the STA may be parallel with the time of the ONU PON applying for the corresponding bandwidth from the OLT based on the inform signaling from the AP, thereby achieving the purpose of compressing transmission latency of the uplink data.

Referring to FIG. 5 again, the AP may return the CTS signaling based on the RTS signaling while sending the inform signaling carrying the data packet information to the ONU PON at Time point 2. That is, after receiving the RTS signaling from the STA and determining that the recipient is the AP, the AP returns the CTS signaling to the STA while sending the inform signaling carrying the data packet information to the ONU PON at the same time.

In some embodiments, the step of sending, based on the data transmission request of the STA, inform signaling carrying data packet information to the ONU PON includes:

sending, after a data transmission request of the STA is collected based on a polling mode, the inform signaling carrying the data packet information to the ONU PON according to an expected frame transmission instruction.

Here, the AP may obtain the data transmission request of the STA in other modes. For example, the AP may collect the data transmission request from the STA in a polling mode. After collecting the data transmission request from the STA and before starting receiving the uplink service data sent from the STA, the AP creates an expected frame transmission instruction in response to the service data sent from the STA. That is, the AP informs software of an instruction to start receiving the service data sent from the STA. The AP sends, based on the expected frame transmission instruction, inform signaling carrying data packet information to the ONU PON so that before receiving the data packet, the ONU PON can apply for the bandwidth corresponding to the data packet information from the OLT based on the data packet information carried in the inform signaling. In order to reduce the latency as much as possible, After collecting the data transmission request from the STA, the AP should send the inform signaling carrying the data packet information to the ONU PON at a time point as soon as possible, and before actually receiving the uplink service data sent from the STA, the AP sends, based on the expected frame transmission instruction, inform signaling carrying data packet information to the ONU PON so that the time of the AP receiving the uplink service data from the STA may be parallel with the time of the ONU PON applying for the corresponding bandwidth from the OLT based on the inform signaling from the AP, which can also achieve the purpose of compressing transmission latency of the uplink data.

Referring to FIG. 5 again, after collecting the data transmission request from the STA in a polling mode, the AP may send, based on the expected frame transmission instruction, the inform signaling carrying the data packet information to the ONU PON at Time point 3. That is, after the AP collects the data transmission request from the STA in a polling mode or other modes, when the STA starts transmission of the uplink service data to the AP, the AP creates an expected frame transmission instruction in response to the service data sent from the STA to start receiving the uplink service data from the STA, and sends, based on the expected frame transmission instruction, inform signaling carrying data packet information to the ONU PON.

It should be noted that, in order to reduce the latency as much as possible, after receiving the data transmission request from the STA, the AP should send the inform signaling carrying the data packet information to the ONU PON at a time point as soon as possible. As shown in FIG. 5, the AP may send the inform signaling to the ONU PON at Time point 1, Time point 2 or Time point 3. Both Time points 1 and 2 are before the time when the STA is ready to send the uplink service data to the AP, and thus have better latency compression effect. In a scenario where all the interactions of the RTS signaling and the CTS signaling between the STA and the AP are processed by hardware, the AP may send the inform signaling carrying data packet information to the ONU PON according to an expected frame transmission instruction at the same time as when the STA starts sending the uplink service data to the AP, that is, at Time point 3 shown in the figure. The knowledge of the Time point 3 does not require any modification of the network devices, and thus Time point 3 has better compatibility.

In some embodiments, before sending the inform signaling carrying the data packet information to the ONU PON, the method includes:

determining the data packet information according to Network Allocation Vector (NAV) information carried in the RTS signaling.

Here, the data packet information refers to length information of the data packet. The NAV information refers to the time during which a wireless medium is occupied for data transmission. The RTS signaling carries the NAV information. In this manner, the AP can, based on the NAV signaling in the received RTS signaling, obtain a length of the data packet to be sent, and form an inform instruction carrying the length information of the data packet that is sent to the ONU PON so that the ONU PON can timely know the inform instruction and apply for the corresponding bandwidth from the OLT based on the length information of the data packet.

In some embodiments, before sending the inform signaling carrying the data packet information to the ONU PON, the method includes:

determining whether the STA is a latency sensitive STA of a designated type according to the RTS signaling and set attribute information of the STA.

Here, in the WLAN and PON networking, the uplink service data may be divided into two modes, i.e., a single-service mode and a multi-service mode. The single-service mode refers to a mode in which only one low-latency WLAN service, or possibly other non-WLAN services, is present on the ONU, and different services are fitted to different bandwidth units (T-CONTs) of the PON for transmission. The multi-service mode refers to a mode in which, besides the low-latency WLAN service, other WLAN services not sensitive to latency are also present on the ONU, and different services are fitted to different T-CONTs of the PON for transmission. Different services may be distinguished according to different STA attributes, such as STA addresses; and the set STA attribute may refer to information of the STA attribute obtained by setting in advance. For the multi-service mode, after receiving the RTS signaling, the AP performs confirmation as to whether the receiving end is the AP, and judges whether the STA is a latency sensitive STA of a designated type, i.e., whether the RTS signaling is sent from a latency sensitive STA. If the receiving end is the AP and the STA is a latency sensitive STA of the designated type, the step of sending the inform signaling carrying the data packet information to the ONU PON is performed. If the receiving end is not the AP, or if the source is not a latency sensitive STA of the designated type, the step of sending the inform signaling carrying the data packet information to the ONU PON is not performed, and the subsequent transmission of service data may be forwarded using the data transmission method shown in FIG. 1.

Figure 6:
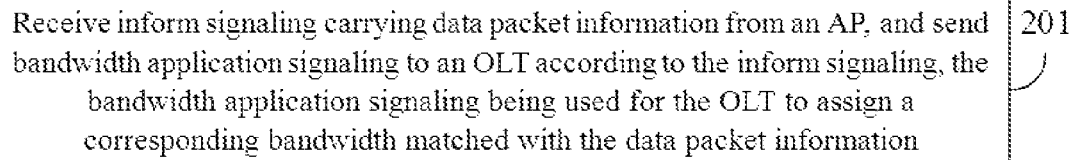
FIG. 6 is a schematic flowchart of a data transmission method in another embodiment of the present application.

Referring to FIG. 6, in another aspect of the embodiment of the present application, there is further provided a data transmission method that is applicable to the ONU PON shown in FIG. 2 or FIG. 3, and the method includes the following step 201.

At step 201, receiving inform signaling carrying data packet information from a wireless Access Point (AP), and sending bandwidth application signaling to an Optical Line Terminal (OLT) according to the inform signaling, the bandwidth application signaling being used for the OLT to assign a corresponding bandwidth matched with the data packet information.

Before sending uplink service data to the AP, the STA firstly sends RTS signaling. The AP may collect the data transmission request from the STA based on the received RTS signaling from the STA or based on other modes such as a polling mode, and send, based on the data transmission request of the STA, the inform signaling carrying data packet information to the ONU PON. The ONU PON receives the inform signaling carrying the data packet information from the AP, and then sends bandwidth application signaling to the OLT according to the data packet information carried in the inform signaling to obtain the corresponding bandwidth assigned by the OLT based on the bandwidth application signaling.

In the above embodiment of the present application, the ONU PON applies for the corresponding bandwidth from the OLT based on the inform signaling carrying the data packet information sent from the AP, so that before receiving the data packet, the ONU PON can apply for the corresponding bandwidth in advance from the OLT based on the data packet information carried in the inform signaling. In this manner, the time of the ONU PON applying for the bandwidth corresponding to the service data to be transmitted from the OLT is parallel with the time of transmitting the service data to be transmitted from the STA to the ONU PON, thereby achieving the purpose that the ONU PON can apply for the bandwidth corresponding to the service to be transmitted in advance to compress the latency. The effective coordination between the PON and the WLAN can be achieved through the inform signaling between the AP and the ONU PON and the bandwidth application signaling between the ONU and the OLT without significant modifying the network devices, so that a good compatibility of network devices is achieved, and latency of the service data from the STA to the OLT of the PON can be effectively reduced on the premise of minimizing the cost.

In some embodiments, the method further includes:

receiving service data sent from a corresponding Station (STA) and forwarded by the AP, and forwarding the service data according to the corresponding bandwidth assigned by the OLT.

According to the service data sent from the STA and forwarded by the AP, the ONU PON forwards the service data according to the corresponding bandwidth assigned by the OLT.

After receiving the bandwidth application signaling from the ONU PON, the OLT assigns a corresponding bandwidth to the AP corresponding to the ONU PON, the AP receives the service data sent from the STA and forwards the same to the ONU PON, and the ONU PON receives the service data sent from the STA and forwarded by the AP, the corresponding service data may be directly forwarded to the OLT via the assigned corresponding bandwidth, thereby reducing the uplink latency of the service data from the STA to an uplink interface of the OLT in the PON.

In some embodiments, the step of sending bandwidth application signaling to the OLT according to the inform signaling includes:

sending the bandwidth application signaling to the OLT via an original signaling channel according to the inform signaling, wherein in the original signaling channel, the bandwidth application signaling has a transmission priority higher than other signaling; or sending the bandwidth application signaling to the OLT via a designated dedicated channel according to the inform signaling.

Here, the original signaling channel refers to an existing transmission channel for the bandwidth application signaling between the ONU PON and the OLT. As shown in FIG. 1, in a known data transmission method based on WLAN and PON networking, for a report signaling channel between the ONU PON and the OLT, taking Gigabit-Capable PON (GPON)/XG-Passive Optical Network (XGPON) as an example, the original signaling channel may be defined as a Dynamic Bandwidth Report uplink (DBRu) signaling channel defined by the broadband passive optical integrated access standard (ITU-T G.984.3/G.987.3). In order to further ensure timely transmission of the bandwidth application signaling, the signaling between the ONU PON and the OLT is redefined, in which the bandwidth application signaling is defined as DATARequest signaling, and the DATARequest signaling has a transmission priority higher than other report signaling. After receiving the DATARequest signaling, the OLT gives priority to assigning a corresponding bandwidth to services of the ONU PON, so as to obtain the bandwidth assigned by the OLT with a higher priority. The dedicated channel refers to a transmission channel dedicated to transmission of the bandwidth application signaling between the ONU PON and the OLT, and is usually determined by redefinition.

In some embodiments, the step of sending the bandwidth application signaling to the OLT via the designated dedicated channel according to the inform signaling includes: providing, in a case where the PON is a GPON, the designated dedicated channel as a Physical Layer Operations, Administration and Maintenance (PLOAM) channel. Still taking GPON/XGPON as an example, the dedicated channel may be defined as a PLOAM channel defined by the broadband passive optical integrated access standard (ITU-T G.984.3/G.987.3). After receiving the DATARequest signaling, the OLT notifies the DBA to assign a corresponding bandwidth to services of the ONU PON, so as to obtain, with a higher priority, the bandwidth assigned by the OLT.

In some embodiments, the method further includes:

sending bandwidth cancel signaling to the OLT in response to determining that no inform signaling is received within a set time threshold.

Here, the corresponding bandwidth allocated by the OLT based on the DATARequest signaling in response to the application of the ONU PON is a fixed bandwidth. In this manner, latency of the subsequent uplink service data of the STA is effectively reduced, and there is no need to apply for a bandwidth each time when the WLAN has continuous service data to be uploaded; since the uplink bandwidth can be obtained for a long time. In order to ensure that resources are released in time after the subsequent upload of service data by the WLAN, bandwidth cancel signaling, which is defined as DATACancel signaling, is further added when the signaling between the ONU PON and the OLT is redefined. When the STA has continuous service data to be uploaded subsequently, the AP sends inform signaling to the ONU PON based on the RTS signaling each time before the STA sends the service data. In this manner, the ONU PON may determine continuity of the service data uploaded by the WLAN according to the received inform signaling from the AP. When determining that no inform signaling is received within a set time threshold, the ONU PON sends DATACancel signaling to the OLT to notify the OLT to stop assignment of the fixed bandwidth to the related services of the ONU PON and to release bandwidth resources.

In some embodiments, the step of sending bandwidth cancel signaling to the OLT in response to determining that no inform signaling is received within a set time threshold includes:

switching to a WORKING state after sending the bandwidth application signaling to the OLT according to the inform signaling;

starting timing in the WORKING state, and resetting and re-timing in a case where the inform signaling is received within the time threshold; and sending, in a case where no inform signaling is received within the time threshold, the bandwidth cancel signaling to the OLT and switching from the WORKING state to an IDLE state.

Here, in view of the transmission requirements of the DATARequest signaling and the DATACancel signaling, when the signaling between the ONU PON and the OLT is redefined, a parameter time td is further defined, via which the time during which the ONU PON has no data application is recorded. The ONU PON switches to a WORKING state after sending the bandwidth application signaling to the OLT according to the inform signaling; starts timing in the WORKING state, and resets and re-times in a case where the inform signaling is received within the time threshold; and sends, in a case where no inform signaling is received within the time threshold, the bandwidth cancel signaling to the OLT and switches from the WORKING state to an IDLE state. In this manner, the ONU PON records continuity of inform signaling received from the AP by defining the parameter td, and sends the DATACancel signaling to the OLT in response to determining that no inform signaling is received within a set time threshold, i.e., when the parameter td exceeds the time threshold, to notify the OLT to stop assignment of the fixed bandwidth to the related services of the ONU PON and to release bandwidth resources.

Figure 7:
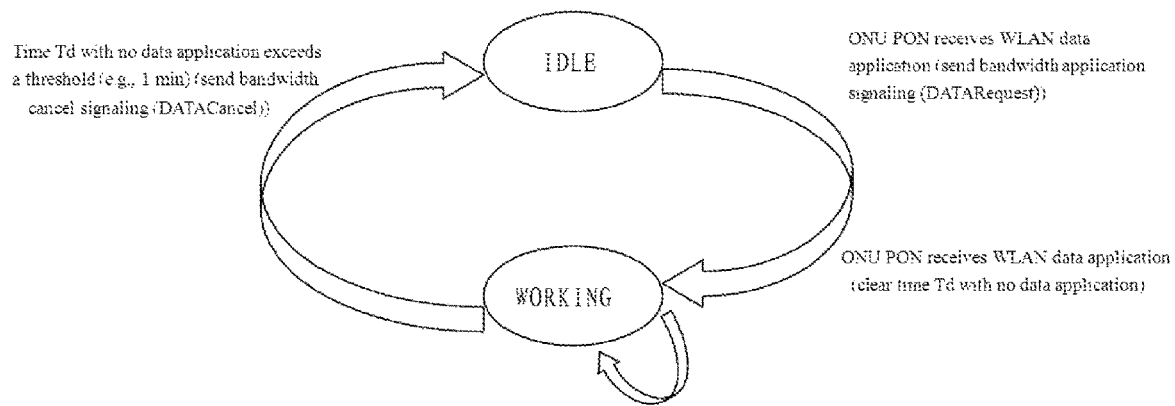
FIG. 7 is a schematic diagram illustrating states of an ONU PON in an embodiment of the present application.

Referring to FIG. 7, the ONU PON includes two states, i.e., a WORKING state and an IDLE state. In the IDLE state, the ONU PON, if receives a WLAN data request (i.e., inform signaling from the AP), sends DATARequest to the OLT, while migrating to the WORKING state at the same time. In the WORKING state, td starts to time from 0, and if the ONU PON continuously receives the inform signaling, td is cleared; if no inform signaling is received for a period of time, td continues to increase, and when td exceeds a predetermined threshold (for example, 1 minute), the ONU PON sends DATACancel signaling to the OLT, while migrating to the IDLE state at the same time.

In the data transmission method provided in the above embodiments of the present application, the AP directly sends inform signaling carrying data packet information to the ONU PON based on the RTS signaling sent from the STA, so that before the data packet is received, the corresponding bandwidth can be applied in advance from the OLT via the ONU PON based on the data packet information carried in the inform signaling. In this manner, effective coordination between the PON and the WLAN can be achieved through the inform signaling between the AP and the ONU PON and the DATARequest/DATACancel between the ONU and the OLT. The ONU PON can apply for the bandwidth corresponding to the service to be transmitted in advance, so as to obtain good compatibility of network devices, and latency of the service data from the STA to the OLT of the PON can be effectively reduced on the premise of minimizing the cost.

Figure 8:
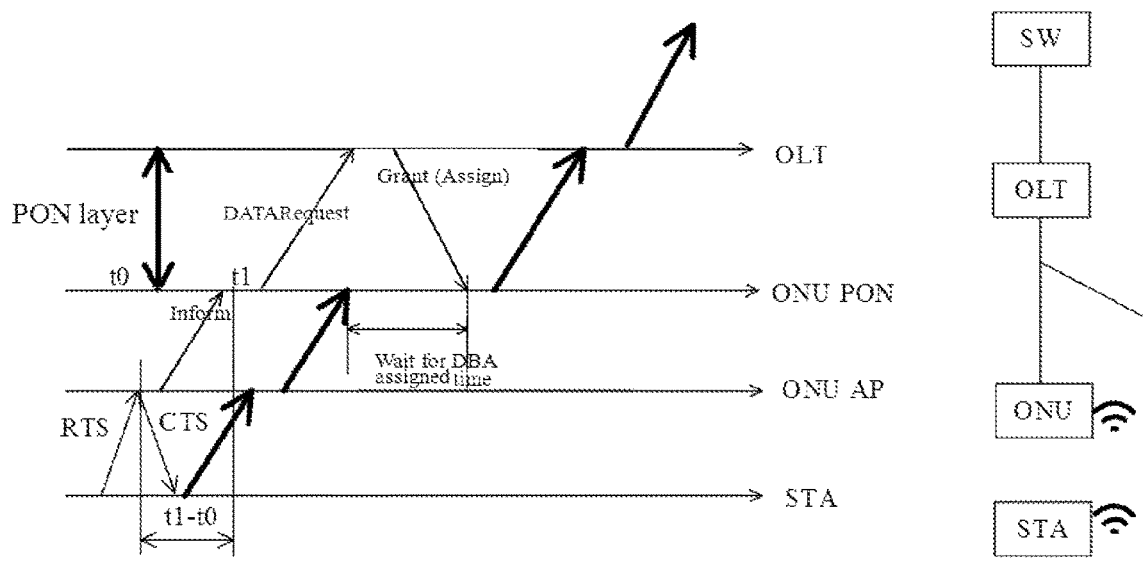
FIG. 8 is a schematic diagram of a data transmission method based on WLAN and PON networking in an embodiment of the present application.

Referring to FIG. 8, FIG. 8 is a schematic diagram of a data transmission method based on WLAN and PON networking provided by an embodiment of the present application, in which before sending uplink service data to the AP, the STA firstly sends RTS signaling to the AP. The RTS signaling carries Network Allocation Vector (NAV) information, the time during which a wireless medium is occupied for data transmission, from which a length of the data packet to be sent can be obtained. If the AP determines that the recipient is the AP after receiving the RTS signaling, the AP returns CTS signaling to the STA, and simultaneously sending the inform signaling to the ONU PON and carrying the length information of the data packet. The ONU PON receives the inform signaling at time t1, learns the length of the data packet at the same time, and sends the DATARequest signaling corresponding to the data packet to the OLT. At this time, the ONU PON has already applied for the corresponding bandwidth from the OLT before the data packet reaches the ONU PON, thereby achieving the purpose of compressing the time period between t1 and t0.

Figure 9:
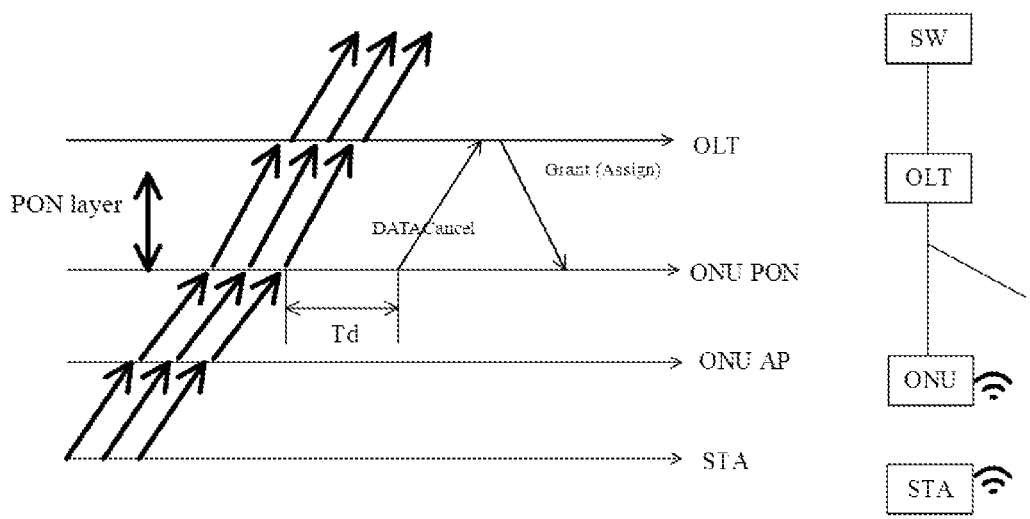
FIG. 9 is a schematic diagram illustrating an ONU PON canceling bandwidth assignment in an embodiment of the present application.

After receiving the bandwidth application signaling from the ONU, the OLT may assign a fixed bandwidth to the AP service corresponding to the ONU PON to effectively reduce time of the subsequent uplink service data. Referring to FIG. 9, there is no need to apply for a bandwidth each time when the WLAN has continuous data messages to be uploaded (indicated by bold arrows), and it is possible to obtain the uplink bandwidth for a long time. In order to ensure timely release of bandwidth resources, DATACancel signaling is further added when the signaling between the ONU PON and the OLT is redefined, and the time during which the ONU PON has no data application is recorded by defining the parameter td. When determining that no inform signaling is received within a set time threshold, the ONU PON sends DATACancel signaling to the OLT to notify the OLT to send Grant (Deassign) signaling that indicates cancellation assignment of the fixed bandwidth to the ONU PON, so as to stop assignment of the fixed bandwidth to the related services of the ONU PON and to release bandwidth resources.

In order for further understanding of the implementation process of the data transmission method provided in the embodiments of the present application, the following describes the data transmission method by taking different architectures of the WLAN and PON networking and scenarios in which the single-service mode and the multi-service mode are distinguished as examples.

Figure 10:
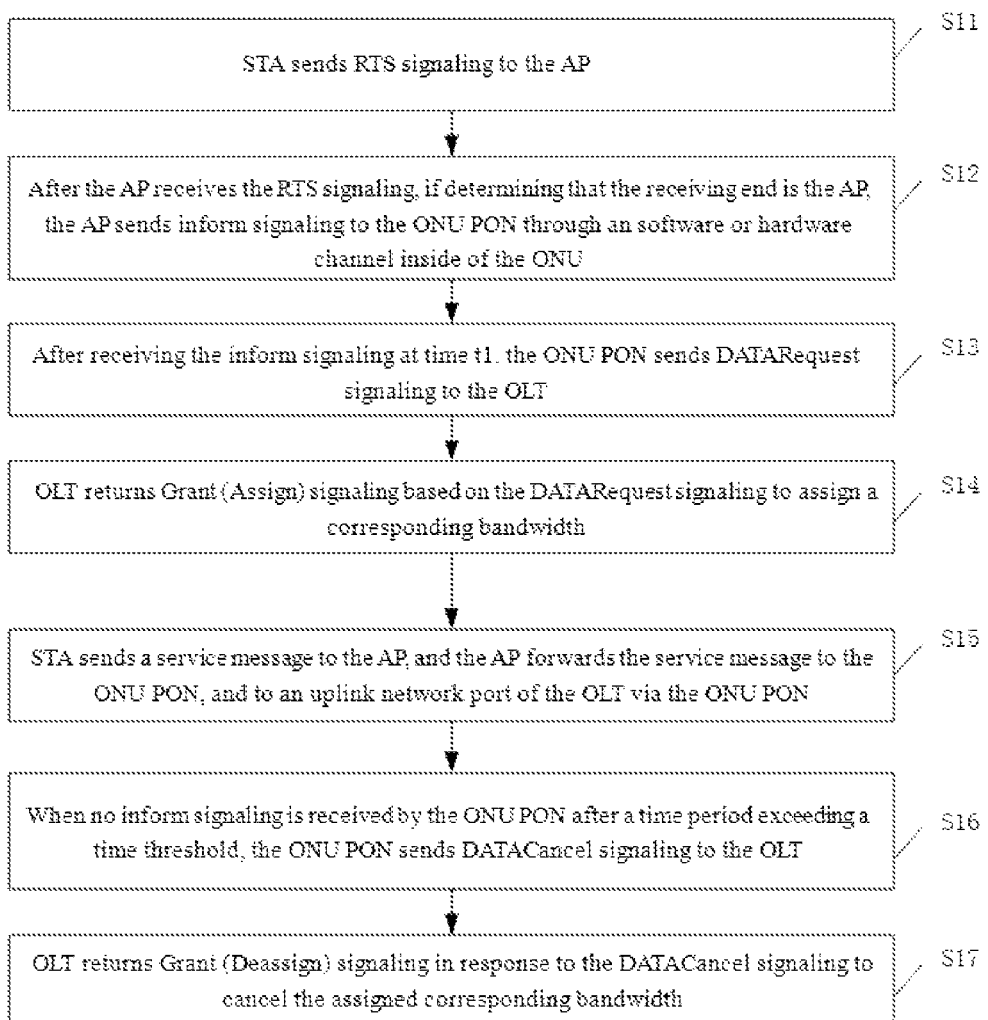
FIG. 10 is a schematic flowchart of a data transmission method corresponding to scenario I in an embodiment of the present application.

Scenario I: taking the example where the WLAN and PON networking includes an AP and an ONU PON together forming networking of an ONU device and corresponds to a single-service scenario, the AP is built in the ONU device, and cooperation between the AP and the ONU PON is mainly implemented through a software interface or a hardware channel inside the ONU. The single-service scenario refers to a scenario in which only one low-latency WLAN service, or possibly other non-WLAN services, is present on the ONU, but the operator adapts different services to different bandwidth units (T-CONTs) of the PON layer for transmission. Referring to FIG. 10, the data transmission method includes the following steps S11 to S17.

At step S11, the STA sends RTS signaling to the AP.

At step S12, after the AP receives the RTS signaling, if determining that the receiving end is the AP, the AP sends inform signaling to the ONU PON through an inner software or hardware channel of the ONU.

At step S13, after receiving the inform signaling at time t1, the ONU PON sends DATARequest signaling to the OLT.

At step S14, the OLT returns Grant (Assign) signaling based on the DATARequest signaling to assign a corresponding bandwidth.

At step S15, the STA sends a service message to the AP, and the AP forwards the service message to the ONU PON and to an uplink network port of the OLT via the ONU PON.

At step S16, when no inform signaling is received by the ONU PON after a time period exceeding a time threshold, the ONU PON sends DATACancel signaling to the OLT.

At step S17, the OLT returns Grant (Deassign) signaling in response to the DATACancel signaling to cancel the assigned corresponding bandwidth.

Figure 11:
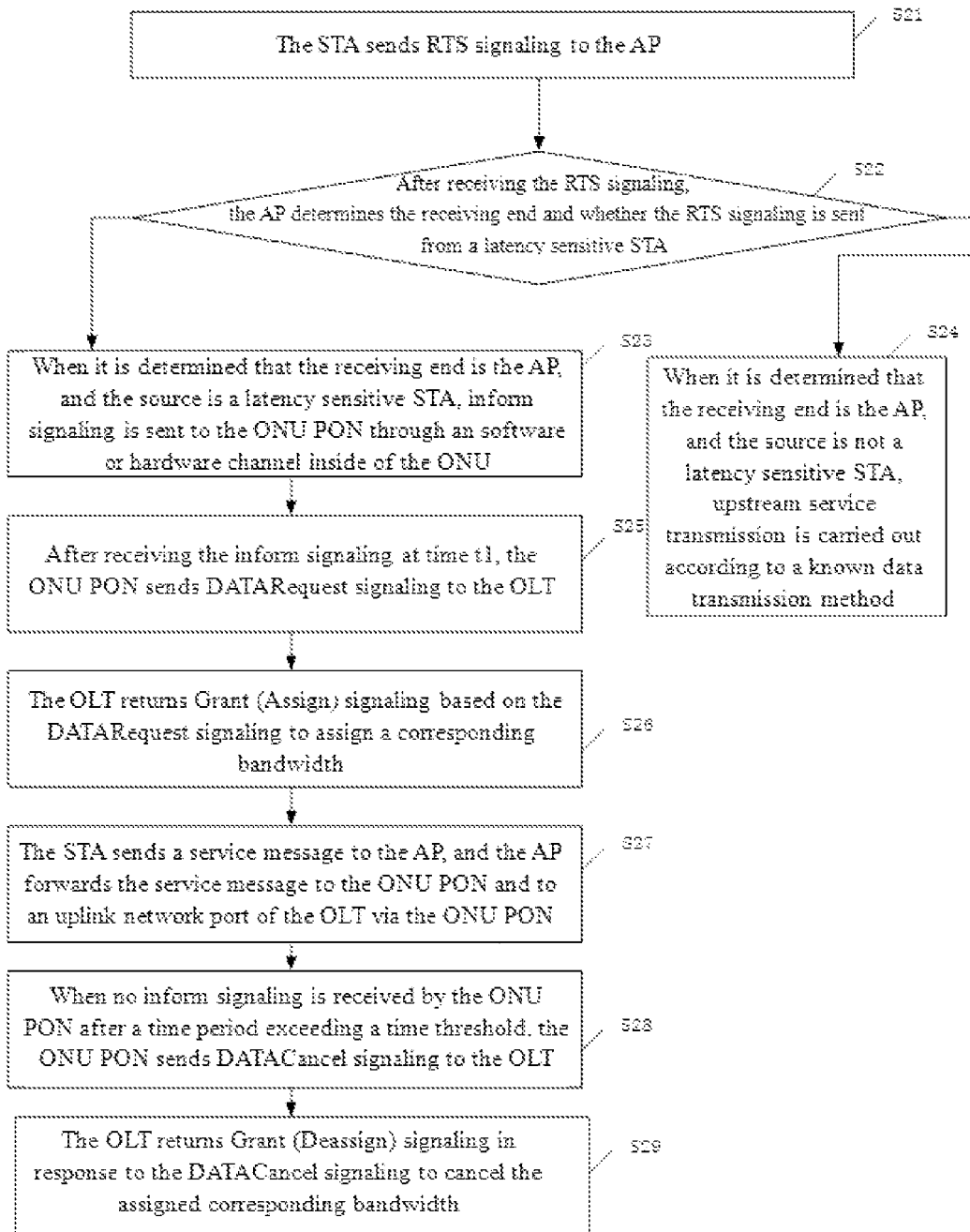
FIG. 11 is a schematic flowchart of a data transmission method corresponding to scenario II in an embodiment of the present application.

Scenario II: taking the example where the WLAN and PON networking includes an AP and an ONU PON together forming networking of an ONU device and corresponds to a multi-service scenario, the AP is built in the ONU device, and cooperation between the AP and the ONU PON is mainly implemented through a software interface or a hardware channel inside the ONU. The multi-service scenario refers to a scenario in which, besides the low-latency WLAN service, other WLAN services not sensitive to latency are also present on the ONU, and different services may be distinguished according to different STA addresses. The operator adapts different services on the same ONU to different bandwidth units (T-CONTs) of the PON layer for transmission. Referring to FIG. 11, the data transmission method includes the following steps S21 to S29.

At step S21, the STA sends RTS signaling to the AP.

At step S22, after receiving the RTS signaling, the AP determines the receiving end and whether the RTS signaling is sent from a latency sensitive STA.

At step S23, when it is determined that the receiving end is the AP, and the source is a latency sensitive STA, inform signaling is sent to the ONU PON through an inner software or hardware channel of the ONU, and steps S25 to S29 are performed.

At step S24, when it is determined that the receiving end is the AP, and the source is not a latency sensitive STA, uplink service transmission is carried out according to a known data transmission method. The known data transmission method may be a data transmission method based on WLAN and PON networking as shown in FIG. 1.

At step S25, after receiving the inform signaling at time t1, the ONU PON sends DATARequest signaling to the OLT.

In step S26, the OLT returns Grant (Assign) signaling based on the DATARequest signaling to assign a corresponding bandwidth.

And step S27, the STA sends a service message to the AP, and the AP forwards the service message to the ONU PON and to an uplink network port of the OLT via the ONU PON.

At step S28, when no inform signaling is received by the ONU PON after a time period exceeding a time threshold, the ONU PON sends DATACancel signaling to the OLT.

At step S29, the OLT returns Grant (Deassign) signaling in response to the DATACancel signaling to cancel the assigned corresponding bandwidth.

Figure 12:
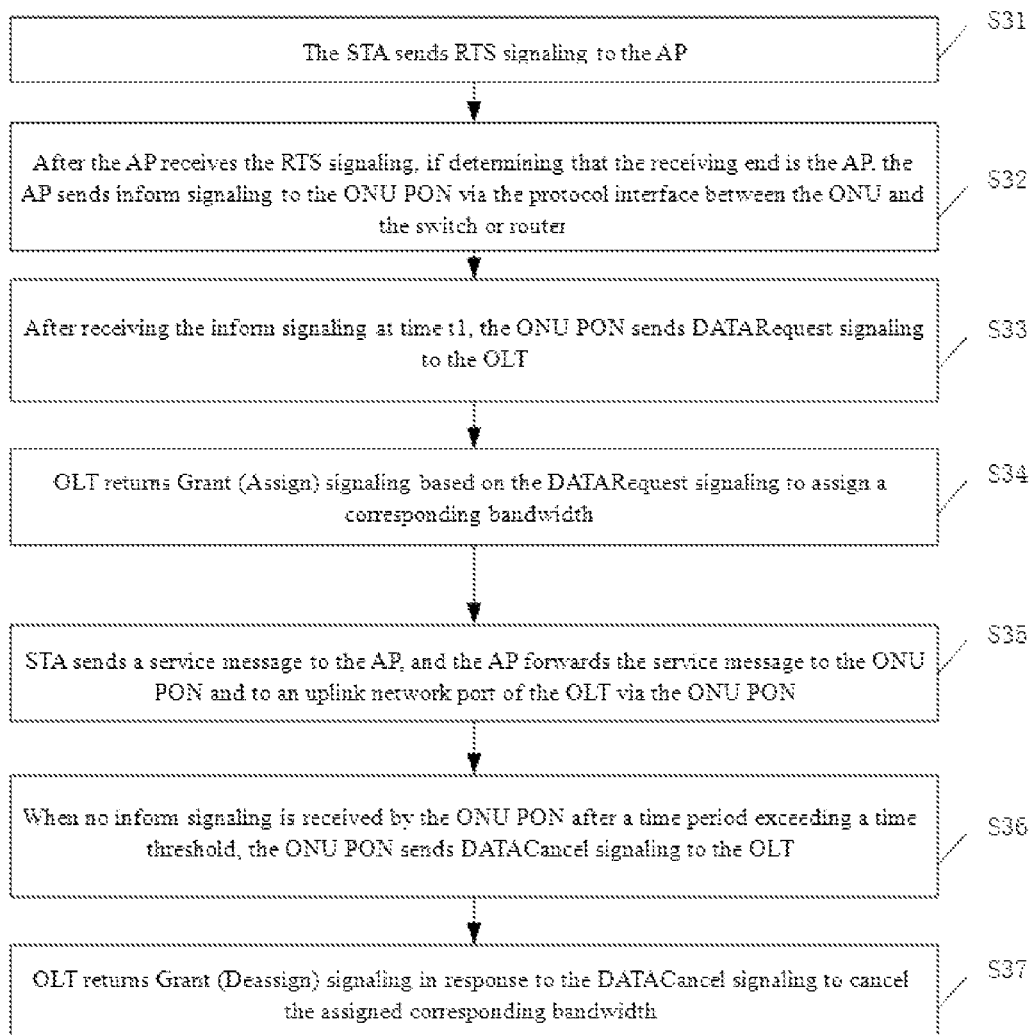
FIG. 12 is a schematic flowchart of a data transmission method corresponding to scenario III in an embodiment of the present application.

Scenario III: taking the example where the WLAN and PON networking includes an AP and an ONU PON connected via an Ethernet interface, and corresponds to a single-service scenario, the AP and the ONU PON are formed as separate, independent devices, and cooperation of the AP and the ONU PON depends on defining a protocol interface between the ONU and a switch or router. The protocol interface meets the requirement of fast transceiving, and meets the requirement of high transmission priority, that is, has a forwarding priority higher than a non-real-time service, or uses a dedicated hardware channel for transmission. In order to guarantee the transmission effectiveness, the protocol interface needs to be provided with a connection-based interaction mechanism to determine the priority of forwarding and a protection mechanism. The single-service scenario refers to a scenario in which only one low-latency WLAN service, or possibly other non-WLAN services, is present on the ONU, but the operator adapts different services to different bandwidth units (T-CONTs) of the PON layer for transmission. Referring to FIG. 12, the data transmission method includes the following steps S31 to S37.

At step S31, the STA sends RTS signaling to the AP.

At step S32, after the AP receives the RTS signaling, if determining that the receiving end is the AP, the AP sends inform signaling to the ONU PON via the protocol interface between the ONU and the switch or router.

At step S33, after receiving the inform signaling at time t1, the ONU PON sends DATARequest signaling to the OLT.

At step S34, the OLT returns Grant (Assign) signaling based on the DATARequest signaling to assign a corresponding bandwidth.

At step S35, the STA sends a service message to the AP, and the AP forwards the service message to the ONU PON and to an uplink network port of the OLT via the ONU PON.

At step S36, when no inform signaling is received by the ONU PON after a time period exceeding a time threshold, the ONU PON sends DATACancel signaling to the OLT.

At step S37, the OLT returns Grant (Deassign) signaling in response to the DATACancel signaling to cancel the assigned corresponding bandwidth.

Figure 13:
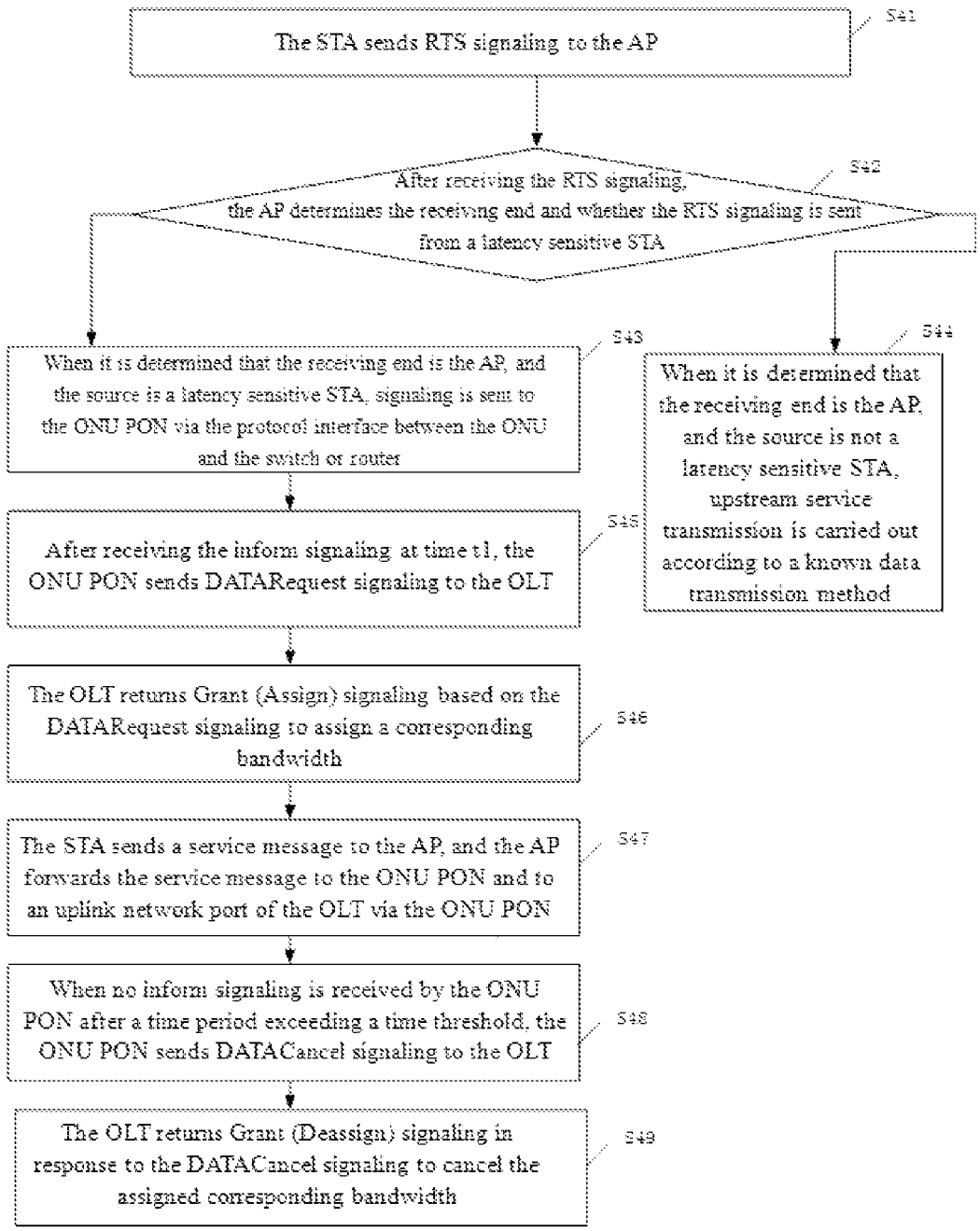
FIG. 13 is a schematic flowchart of a data transmission method corresponding to scenario IV in an embodiment of the present application.

Scenario IV: taking the example where the WLAN and PON networking includes an AP and an ONU PON connected via an Ethernet interface, and corresponds to a multi-service scenario, the AP and the ONU PON are formed as separate, independent devices, and cooperation of the AP and the ONU PON depends on defining a protocol interface between the ONU and a switch or router. The protocol interface meets the requirement of fast transceiving, and meets the requirement of high transmission priority, that is, has a forwarding priority higher than a non-real-time service, or uses a dedicated hardware channel for transmission. In order to guarantee the transmission effectiveness, the protocol interface needs to be provided with a connection-based interaction mechanism to determine the priority of forwarding and a protection mechanism. The multi-service scenario refers to a scenario in which, besides the low-latency WLAN service, other WLAN services not sensitive to latency are also present on the ONU, and different services may be distinguished according to different STA addresses. The operator adapts different services on the same ONU to different bandwidth units (T-CONTs) of the PON layer for transmission. Referring to FIG. 13, the data transmission method includes the following steps S41 to S49.

At step S41, the STA sends RTS signaling to the AP.

At step S42, after receiving the RTS signaling, the AP determines the receiving end and whether the RTS signaling is sent from a latency sensitive STA.

At step S43, when it is determined that the receiving end is the AP, and the source is a latency sensitive STA, signaling is sent to the ONU PON via the protocol interface between the ONU and the switch or router, and steps S45 to S49 are performed.

At step S44, when it is determined that the receiving end is the AP, and the source is not a latency sensitive STA, uplink service transmission is carried out according to a known data transmission method. The known data transmission method may be a data transmission method based on WLAN and PON networking as shown in FIG. 1.

At step S45, after receiving the inform signaling at time t1, the ONU PON sends DATARequest signaling to the OLT.

At step S46, the OLT returns Grant (Assign) signaling based on the DATARequest signaling to assign a corresponding bandwidth.

At step S47, the STA sends a service message to the AP, and the AP forwards the service message to the ONU PON and to an uplink network port of the OLT via the ONU PON.

At step S48, when no inform signaling is received by the ONU PON after a time period exceeding a time threshold, the ONU PON sends DATACancel signaling to the OLT.

At step S49, the OLT returns Grant (Deassign) signaling in response to the DATACancel signaling to cancel the assigned corresponding bandwidth.

However, it should be noted that, in the process of service forwarding, it should be ensured that the protocol data and the low-delay service data has a forwarding priority higher than other services not sensitive to latency. This is true both inside the ONU and inside the switch or router with an AP.

Figure 14:
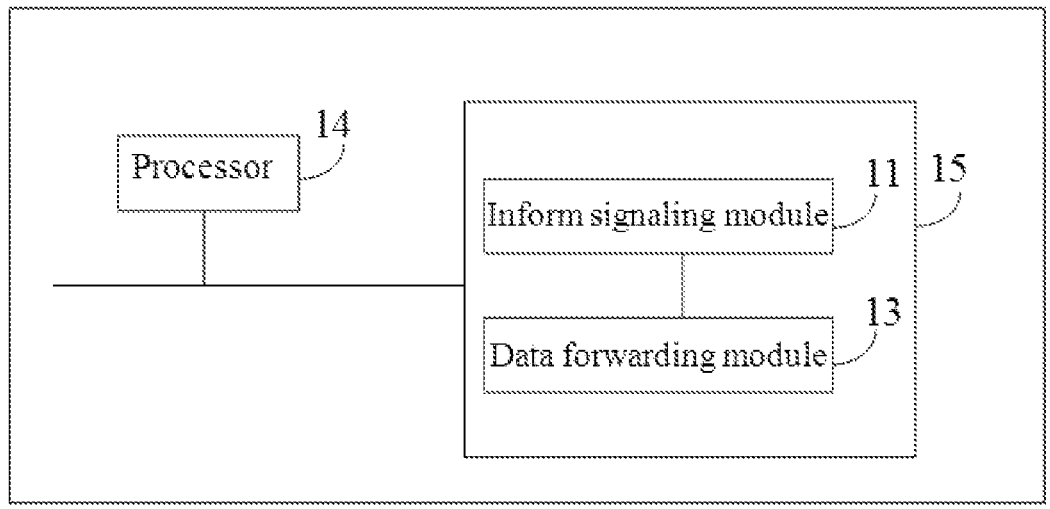
FIG. 14 is a schematic structural diagram of an AP in an embodiment of the present application.

Referring to FIG. 14, in another aspect of the embodiment of the present application, there is provided a data transmission apparatus, including an inform signaling module 11 and a data forwarding module 13 that can be applied to the AP shown in FIG. 2 or FIG. 3. The inform signaling module 11 is configured to send, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information. The data forwarding module 13 is configured to receive service data from the STA and forward the same to the ONU PON, the service data being used to be forwarded to the OLT according to the corresponding bandwidth.

In some embodiments, the inform signaling module 11 is specifically configured to receive RTS signaling from the STA, and send, in a case where a recipient of the RTS signaling is a wireless AP, the inform signaling carrying the data packet information to the ONU PON within a specified time according to the RTS signaling.

In some embodiments, the specified time is an integer multiple of a short interframe space (SIFS).

In some embodiments, the inform signaling module 11 is specifically configured to receive the RTS signaling from the STA, and return, in a case where a recipient of the RTS signaling is determined to be a wireless AP, data response signaling, Clear To Send (CTS), according to the RTS signaling, and simultaneously sending the inform signaling carrying the data packet information to the ONU PON.

In some embodiments, the inform signaling module 11 is specifically configured to send, after a data transmission request of the STA is collected based on a polling mode, the inform signaling carrying the data packet information to the ONU PON according to an expected frame transmission instruction.

In some embodiments, the inform signaling module 11 is further configured to determine the data packet information according to Network Allocation Vector (NAV) information carried in the RTS signaling.

In some embodiments, the inform signaling module 11 is further configured to determine whether the STA is a latency sensitive STA of a designated type according to the RTS signaling and set attribute information of the STA.

In the data transmission apparatus provided in the foregoing embodiments, when implementing the data transmission method, division of program modules is illustrated merely as an example, and in practical applications, the above steps may be allocated to and completed by different program modules as needed, that is, the internal structure of the programs in the data transmission apparatus for implementing the data transmission method may be divided into different program modules to complete all or part of the above-described processing. The data transmission apparatus may be an AP that implements the data transmission method applied to the AP, and specific implementation processes thereof are described in detail in the method embodiments and thus are not repeated here.

Referring to FIG. 14 again, in another aspect of the embodiments of the present disclosure, there is further provided an AP, including a processor 14 and a storage medium 15 storing a computer program executable on the processor 14. The processor 14 is configured to, when executing the computer program, perform steps of the data transmission method applied to the AP provided in any embodiment of the present application. Here, the processor 14 and the storage medium 15 do not refer to a corresponding number of one, but may be one or more. The storage medium 15 may store therein instructions for implementing the data transmission apparatus based on WLAN and PON networking applicable to the AP provided in the embodiments of the present disclosure, and the processor 14 is configured to improve computing and control capabilities to support operation of the whole AP.

Figure 15:
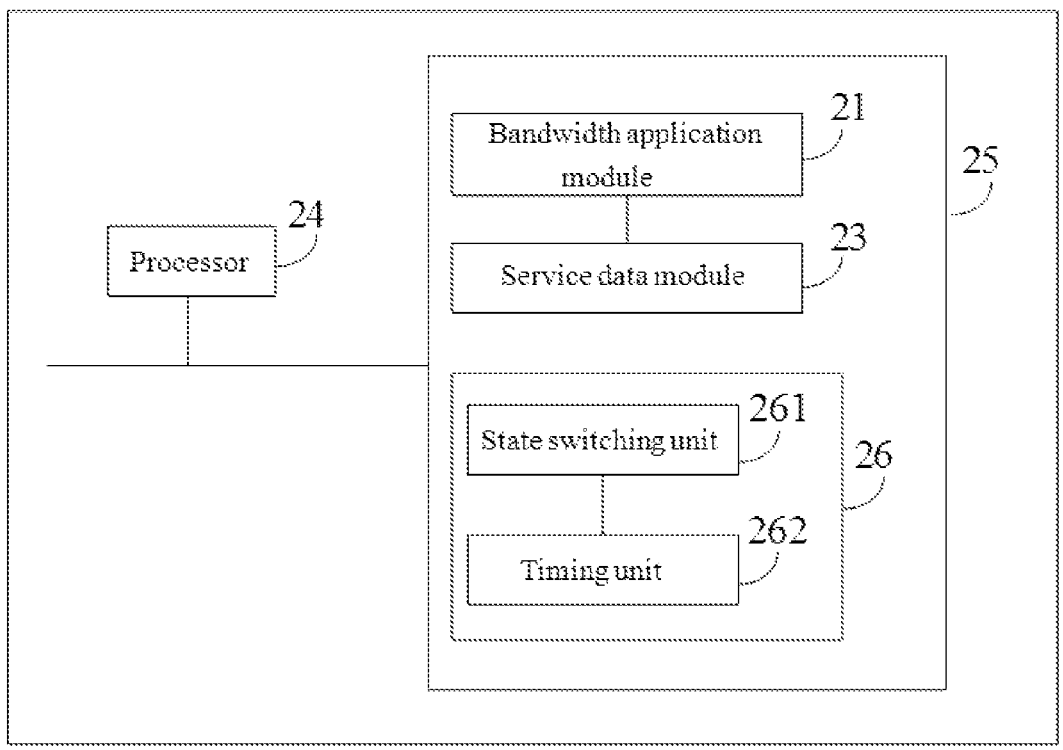
FIG. 15 is a schematic structural diagram of an ONU PON in an embodiment of the present application.

Referring to FIG. 15, in another aspect of the embodiment of the present application, there is provided a data transmission apparatus that is applicable to the ONU PON shown in FIG. 2 or FIG. 3. The apparatus includes a bandwidth application module 21 configured to receive inform signaling carrying data packet information from a wireless Access Point (AP), and send bandwidth application signaling to an Optical Line Terminal (OLT) according to the inform signaling, the bandwidth application signaling being used for the OLT to assign a corresponding bandwidth matched with the data packet information.

In some embodiments, the apparatus further includes a service data module 23 configured to receive service data sent from a corresponding Station (STA) and forwarded by the AP, and forward the service data according to the corresponding bandwidth assigned by the OLT.

In some embodiments, the bandwidth application module 21 is specifically configured to send the bandwidth application signaling to the OLT via an original signaling channel according to the inform signaling, wherein in the original signaling channel, the bandwidth application signaling has a transmission priority higher than other signaling; or, send the bandwidth application signaling to the OLT via a designated dedicated channel according to the inform signaling.

In some embodiments, when the PON is a GPON, the designated dedicated channel is a Physical Layer Operations, Administration and Maintenance (PLOAM) channel.

In some embodiments, the apparatus further includes a bandwidth cancellation module 26 configured to send bandwidth cancel signaling to the OLT in response to determining that no inform signaling is received within a set time threshold.

In some embodiments, the bandwidth cancellation module 26 includes a state switching unit 261 and a timing unit 262. The state switching unit 261 is configured to switch to a WORKING state after sending the bandwidth application signaling to the OLT according to the inform signaling; and the timing unit 262 is configured to start timing in the WORKING state, and reset and re-time in a case where the inform signaling is received within the time threshold. The state switching unit is further configured to send, in a case where no inform signaling is received within the time threshold, the bandwidth cancel signaling to the OLT and switch from the WORKING state to an IDLE state.

In the data transmission apparatus provided in the foregoing embodiments, when implementing the data transmission method, division of program modules is illustrated merely as an example, and in practical applications, the above steps may be allocated to and completed by different program modules as needed, that is, the internal structure of the programs in the data transmission apparatus for implementing the data transmission method may be divided into different program modules to complete all or part of the above-described processing. The data transmission apparatus may be an ONU PON that implements the data transmission method applied to the ONU PON, and specific implementation processes thereof are described in detail in the method embodiments and thus are not repeated here.

Referring to FIG. 15 again, in another aspect of the embodiments of the present disclosure, there is further provided an ONU PON, including a processor 24 and a storage medium 25 storing a computer program executable on the processor 24. The processor 24 is configured to, when executing the computer program, perform steps of the data transmission method provided in any embodiment of the present application. Here, the processor 24 and the storage medium 25 do not refer to a corresponding number of one, but may be one or more. The storage medium 25 may store therein instructions for implementing the data transmission apparatus applicable to the ONU PON provided in the embodiments of the present disclosure, and the processor 24 is configured to improve computing and control capabilities to support operation of the whole ONU PON.

In another aspect of the embodiments of the present disclosure, there is further provided a non-transitory computer-readable storage medium, for example, a memory storing a computer program thereon, the computer program being executable by a processor to implement steps of the data transmission method provided in any embodiment of the present disclosure. The storage medium may be a ferroelectric random access memory (FRAM), a read-only memory (ROM), an erasable programmable read-only memory (EPROM), an erasable programmable read-only memory (EPROM), an electrically erasable programmable read-only memory (EEPROM), a flash memory, a magnetic surface memory, an optical disk, or a compact disc read-only memory (CD-ROM), or other memories; or may be various devices including any one or combination of the above memories.

What is claimed is:

1. A data transmission method, comprising steps of:
receiving inform signaling carrying data packet information sent from a wireless Access Point (AP), and
sending bandwidth application signaling to an Optical Line Terminal (OLT) according to the inform signaling, the bandwidth application signaling being used for the OLT to assign a corresponding bandwidth matched with the data packet information,
wherein the method further comprises:
sending bandwidth cancel signaling to the OLT in response to determining that no inform signaling is received within a set time threshold.

2. The method according to claim 1, further comprising:
receiving service data sent from a Station (STA) and forwarded by the AP, and forwarding the service data according to the corresponding bandwidth assigned by the OLT.

3. The method according to claim 1, wherein the step of sending the bandwidth application signaling to the OLT according to the inform signaling comprises:
sending the bandwidth application signaling to the OLT via an original signaling channel according to the inform signaling, wherein in the original signaling channel, the bandwidth application signaling has a transmission priority higher than other signaling; or,
sending the bandwidth application signaling to the OLT via a designated dedicated channel according to the inform signaling.

4. The method according to claim 3, wherein the step of sending the bandwidth application signaling to the OLT via the designated dedicated channel according to the inform signaling comprises:
providing, in a case where a Passive Optical Network (PON) is a Gigabit Passive Optical Network (GPON), the designated dedicated channel as a Physical Layer Operations, Administration and Maintenance (PLOAM) channel.

5. The method according to claim 1, wherein the step of sending bandwidth cancel signaling to the OLT in response to determining that no inform signaling is received within a set time threshold comprises:
switching to a WORKING state after sending the bandwidth application signaling to the OLT according to the inform signaling;
starting timing in the WORKING state, and resetting and re-timing in a case where the inform signaling is received within the time threshold; and
sending, in a case where no inform signaling is received within the time threshold, the bandwidth cancel signaling to the OLT and switching from the WORKING state to an IDLE state.

6. A Passive Optical Network module of an Optical Network Unit (ONU PON), comprising a processor, and a memory configured to store a computer program executable on the processor, wherein
the processor is configured to, when executing the computer program, perform the data transmission method according to claim 1.

7. A non-transitory computer-readable storage medium storing executable instructions thereon which, when executed by a processor, cause the data transmission method according to claim 1 to be implemented.

8. Networking of a Wireless Local Area Network (WLAN) and a Passive Optical Network (PON), comprising a data transmission apparatus and a data transmission apparatus, which together form an Optical Network Unit (ONU) device, wherein the data transmission apparatus comprises:

an inform signaling module configured to send, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information; and a data forwarding module configured to receive service data sent from the STA and forward the same to the ONU PON, the service data being used to be forwarded to the OLT according to the corresponding bandwidth;

wherein the data transmission apparatus comprises:

a bandwidth application module configured to receive inform signaling carrying data packet information sent from a wireless Access Point (AP), and send bandwidth application signaling to an Optical Line Terminal (OLT) according to the inform signaling, the bandwidth application signaling being used for the OLT to assign a corresponding bandwidth matched with the data packet information; and a bandwidth cancellation module configured to send bandwidth cancel signaling to the OLT in response to determining that no inform signaling is received within a set time threshold.

9. Networking of a Wireless Local Area Network (WLAN) and a Passive Optical Network (PON), comprising a wireless Access Point (AP) and a Passive Optical Network module of an Optical Network Unit (ONU PON), the AP and the ONU PON being connected via an Ethernet interface, wherein the wireless Access Point (AP) comprising a first processor, and a first memory configured to store a computer program executable on the first processor, wherein the first processor is configured to, when executing the computer program stored in the first memory, perform steps of:

sending, based on a data transmission request of a Station (STA), inform signaling carrying data packet information to a Passive Optical Network module of an Optical Network Unit (ONU PON), the inform signaling being used for the ONU PON to apply for a corresponding bandwidth from an Optical Line Terminal (OLT) based on the data packet information; and receiving service data sent from the STA and forwarding the same to the ONU PON, the service data being used to be forwarded to the OLT according to the corresponding bandwidth; and wherein the Passive Optical Network module comprises a second processor, and a second memory configured to store a computer program executable on the second processor, wherein the second processor is configured to, when executing the computer program stored in the second memory, perform steps of:

receiving the inform signaling carrying data packet information sent from the AP;

sending bandwidth application signaling to the OLT according to the inform signaling, the bandwidth application signaling being used for the OLT to assign a corresponding bandwidth matched with the data packet information; and sending bandwidth cancel signaling to the OLT in response to determining that no inform signaling is received within a set time threshold.

\* \* \* \* \*